United States Patent [19]
Glowatzki

[11] Patent Number: 4,770,287
[45] Date of Patent: Sep. 13, 1988

[54] BUCKET CONVEYOR

[76] Inventor: Waldemar Glowatzki, Dorfstrasse 27, D-3004 Isernhagen 2, Fed. Rep. of Germany

[21] Appl. No.: 851,333

[22] Filed: Apr. 14, 1986

[30] Foreign Application Priority Data

Apr. 13, 1985 [DE] Fed. Rep. of Germany ....... 3513280

[51] Int. Cl.$^4$ ...................... B65G 17/48; B65G 17/36; B65G 47/40
[52] U.S. Cl. ................................... 198/706; 198/708; 198/712; 198/800
[58] Field of Search ............... 198/706, 708, 711, 712, 198/800

[56] References Cited

U.S. PATENT DOCUMENTS

| | | | |
|---|---|---|---|
| 725,573 | 4/1903 | LeGrand | 198/706 |
| 748,576 | 1/1904 | Bivert | 198/706 |
| 906,858 | 12/1908 | Blum | 198/706 |
| 1,054,305 | 2/1913 | Mueller | 198/706 |
| 1,342,789 | 6/1920 | Anderson | 198/706 |
| 3,055,486 | 9/1962 | Meyer | 198/706 |
| 3,381,796 | 5/1968 | Gregor | 198/706 |
| 3,409,118 | 11/1968 | Meyer | 198/706 |
| 3,795,305 | 3/1974 | Sandvik | 198/706 |
| 4,232,782 | 11/1980 | Ikeda | 198/706 |
| 4,493,413 | 1/1985 | Harrell | 198/706 |

FOREIGN PATENT DOCUMENTS

| | | | |
|---|---|---|---|
| 272140 | 3/1914 | Fed. Rep. of Germany | 195/706 |
| 2407826 | 9/1978 | Fed. Rep. of Germany . | |
| 2546748 | 8/1981 | Fed. Rep. of Germany . | |
| 598503 | 12/1925 | France | 198/145 |
| 21301 | 2/1980 | Japan | 198/706 |
| 95029 | 6/1983 | Japan | 198/706 |
| 216806 | 12/1983 | Japan | 198/706 |
| 249281 | 6/1970 | U.S.S.R. | 198/706 |

Primary Examiner—Gary L. Smith
Assistant Examiner—Eric K. Nicholson
Attorney, Agent, or Firm—Allegretti & Witcoff, Ltd.

[57] ABSTRACT

A bucket conveyor with a pair of parallel draw elements between which the buckets are supported on spindles about which they rotate pendulum fashion. Forward rollers are mounted on the ends of the spindles and rear rollers are mounted at the opposite edge of the bucket. Each bucket has a flange or lip which overlaps the top edge of an adjacent bucket. The rollers on the buckets engage guide rails to properly orient the buckets as they pass over return gears and from the loading area to the dumping area and back again. By maintaining proper orientation of the buckets, the load level of each bucket and thus the capacity of the conveyor is increased. The bucket conveyor is of simple design, has low wear and high conveying capacity.

13 Claims, 3 Drawing Sheets

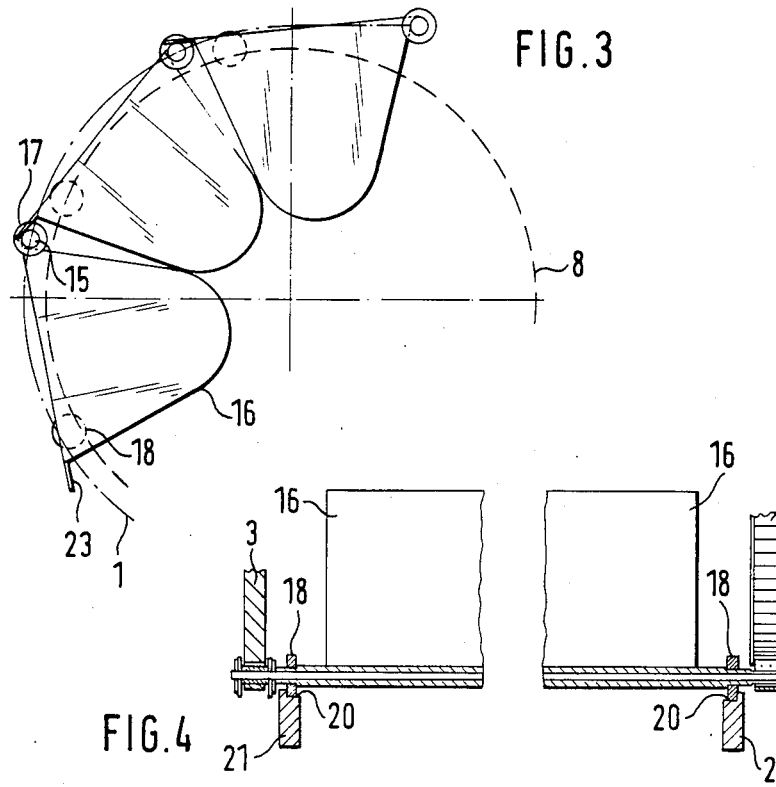
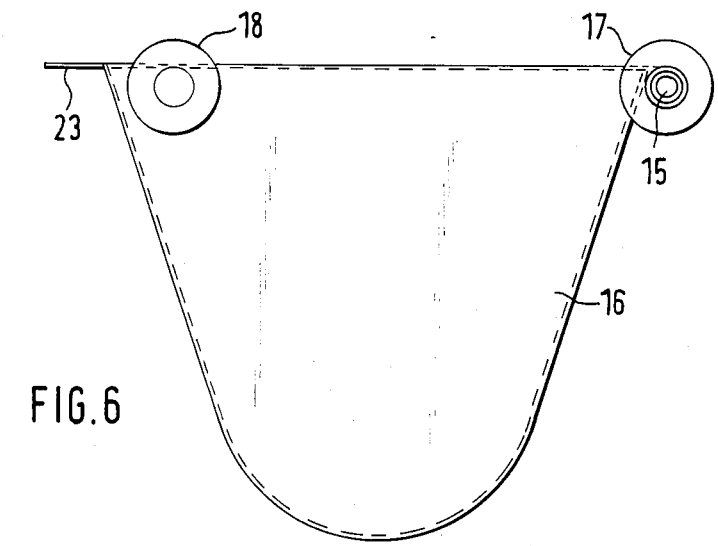

BUCKET CONVEYOR

The present invention concerns a bucket conveyor of simple design and high capacity.

A bucket conveyor is known from German Pat. No. 24 07 826 in which swivel arms are employed as the means of supporting the buckets and are provided with an articulated connection to the buckets and the draw gear. The gap between adjacent buckets is bridged with flexible strips which are capable of accepting the differential between the arc and the secant as the conveyor advances through bends in the return zones. In these zones, the lateral walls of the buckets overlap one another to prevent spillage. This design of bucket conveyor is relatively complex and its capacity will be low because the buckets are continually maintained at essentially the same angle to the conveyor, as result of which the bucket walls will always run at the same oblique angle to the direction of travel. Furthermore, in the overlap area, a high wear rate will be encountered.

A bucket conveyor is known from German Pat. No. 25 46 748 in which the buckets are allowed to swing freely and their openings thus always face upwards. Consequently, this system provides a relatively high conveying capacity. Furthermore, there are no problems of spillage between bucket walls inclined at an angle. This design of bucket conveyor is relatively complex, however, especially on account of the means provided to prevent the buckets from tipping.

A bucket conveyor of the present type is known from German Pat. No. 25 46 748 in which the adjacent lip of each bucket engages the lip of the neighboring bucket to prevent the contents of the buckets from spilling in the loading area. For this purpose, the interlocking bucket lips are hook-shaped, which also serves the purpose of maintaining a distance between each lip and the lip which it overlaps without allowing spillage. This distance is necessary so as to allow the swing buckets to swing positively and adopt a stable position. However, since, as in the case discussed perviously, this is also a swing bucket conveyor system, its design will suffer from the same disadvantages of complexity, especially on account of the means provided to control the buckets and prevent them from tipping.

The purpose of the present invention is to provide a bucket conveyor of the present type which does not suffer from the disadvantages of known bucket conveyors, i.e., a system of simple design and consequently low cost, which provides high conveying capacity and which furthermore does not incorporate components subject to high wear rates.

The fundamental concept of the present invention consists of essentially combining the advantages of both types of conveyors described above and avoiding their disadvantages. This bucket conveyor operates partially like a swing bucket conveyor so that the bucket fill level and thus the capacity of the system are relatively high. On the other hand, unlike existing type of bucket conveyors, this system does not require any complex means of control, since care is taken to insure that the buckets cannot tip out of the conveyor path against the bearing direction of the support lips. As in the case of existing bucket conveyor systems, the buckets will also adopt positions in which the filling opening faces downwards and the load tipped out. The means of preventing spillage may consist of fixed bearing rails comprising cam surfaces on which the side of the buckets opposite the side from which the bucket is suspended are preferably supported by means of lateral studs or rollers. Orientation of the buckets may also be controlled by stops comprising the walls of the buckets themselves which engage with corresponding counter stops in adjacent buckets or on the draw gear. These stops and/or counter stops may be formed by sizing the walls of adjacent buckets and the distances between them, so that as the buckets tend to tip away from the conveyor path, they collide with one another and tipping is thus prevented. A further way of preventing tipping consists of employing springs with which the buckets are preloaded against tipping movement.

In a particularly useful embodiment of the present invention guide or support means are provided for preventing the buckets quite simply from hanging down from their spindles as they are conveyed upwards, which would tend to limit the load level. These means insure that the buckets are displaced from their hanging position to a position in which the filling opening is largely directed upwards, so that the load level and thus the capacity of the conveyor is increased.

Displacing or swinging the buckets sideways away from their hanging position exerts transverse loads on the draw gear or endless chain which it is perfectly able to accept. The displacement resulting from these lateral tractive forces can be compensated by providing the guide rails with a suitable cam configuration. The draw gear can be maintained in a normal straight position, despite the side forces exerted upon it, provided support rollers on the bucket are fitted. An especially useful construction prevents this sideways displacement by the provision of a counter guide rail. Any of the components of the draw gear or any special parts can slide along the counter guide surface; however, the best solution is to employ guide rollers which can be provided quite simply on extensions of the spindles about which the buckets are allowed to swing freely.

In another version of the invention, the two guide surfaces consist of the two opposite edges of a guide rail, both ends of which are preferably sickle-shaped so that the rollers can run on and off them easily and smoothly. A fixed stop may be provided to abut the side of the bucket at the entry point so that the buckets are slightly tipped at this point, allowing the lateral projections to run up onto the guide surfaces. This construction is especially advantageous if the projections or rollers sliding along the guide surfaces and the counter surfaces are essentially in alignment in the direction of travel of the conveyor, e.g., in the neutral zone of the draw gear.

The present invention will now be dscribed with the help of the accompanying drawing, where FIG. 1 is a side elevational schematic view of one embodiment of a bucket conveyor according to the present invention.

FIG. 3 is an enlarged detail of the area of a return roller.

FIG. 4 is an enlarged view of a partial cross section along the line IV—IV of FIG. 1, showing a chain draw gear.

FIG. 5 shows a mirror image of FIG. 4, showing a rubber toothed belt as a draw gear.

FIG. 6 is an enlarged side view of a bucket.

Figure 1:
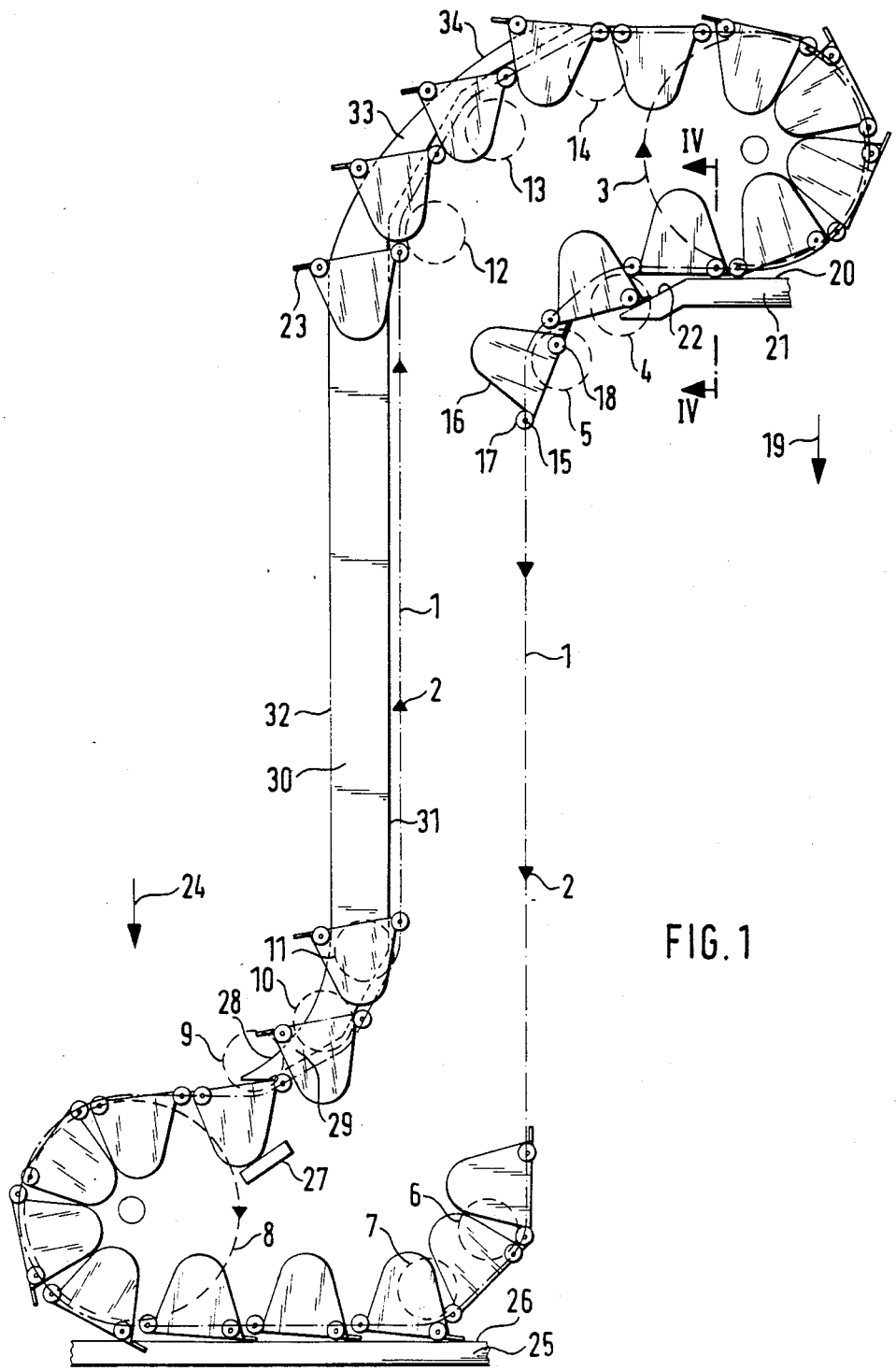

In FIG. 1, draw gear or spaced draw elements 1 runs in the direction of arrows 2 in a continuous loop around schematically represented spaced drive wheels 3 as well as around the return rollers 4, 14. Buckets 16 are attached by means of spindles 15 to the draw gear 1, and can rotate freely at their leading edges about these spindles. In addition, the spindles 15 are provided with a pair of lateral rollers 17 (FIG. 6). Adjacent each support flange or lip 23 projected from the top trailing edge of the bucket, both sides of each bucket 16 are provided with rear roller 18. The rollers 18 ride on the support surface 20 of a support rail 21 in the dumping area 19. The support surface 20 is provided with a sloping end 22 in the direction of travel of the conveyor, which serves to support the rear rollers 18 in the direction of conveyor travel until the forward spindle 15 moves far enough downwards and the buckets 16 have therefore rotated far enough into the loop so that by reason of their own weight the bearing lip 23 provided on each bucket 16 comes to bear on the leading edge of the neighboring bucket 16. This overlapping occurs in a working area indicated by the arrow 24 (left in FIG. 1) in which the buckets 16 are filled, and serves to prevent spillage.

In the vicinity of the return rollers 6 and 7, the buckets support one another on account of their triangular or trapezoidal cross-sectional shape and can thus not be tipped out of their path. To avoid them being tipped in the area downstream of the return rollers 7 and 8, a support rail 25 is provided with a support surface 26 on which the rollers 18 are supported at the rear in the direction of travel of the conveyor. As soon as the buckets 16 arrive in the area of the return roller 8, they again support themselves on one another as a result of their triangular or trapezoidal shape.

A fixed stop 27 is located below the return roller 9 against which the lower edge of the buckets 16 come to bear and are thus slightly tipped, so that the roller 18 at the rear in the direction of travel is raised and thus runs onto the edge 28 of the sickle-shaped section 29 of a guide rail 30. The rollers 17 at the front in the direction of travel remain below the sickle-shaped section 29 of the guide rail 30, whereas rollers 18 run along a guide surface 32. The distances from the counter guide rail 31 and the guide rail 32 are slightly less than the clearance between the rollers 17 and 18, in order to prevent the forces from becoming excessive. These forces result from the fact that in the area of their spindles the buckets are drawn upwards by the draw gear, while the loaded weight of the buckets 16 exerts a downward pull. In this way, any jamming effect is limited. The determinant factor is that the opening of the buckets 16 is maintained essentially facing upwards in the area of the guide rail 30, allowing the buckets to be completely filled, thus providing a high conveyor capacity.

In the area of the return rollers 12, 13 and 14, the guide rail 30 comes to an end with the sickle-shaped section 33 with an upper guide surface 34, thus providing a smooth transition into the upper horizontal area of the conveyor. In the area of the drive wheels 3, the buckets 16 again abut, thus preventing tipping and spillage, just as in the case of the area adjacent to the return roller 8.

Figure 2:
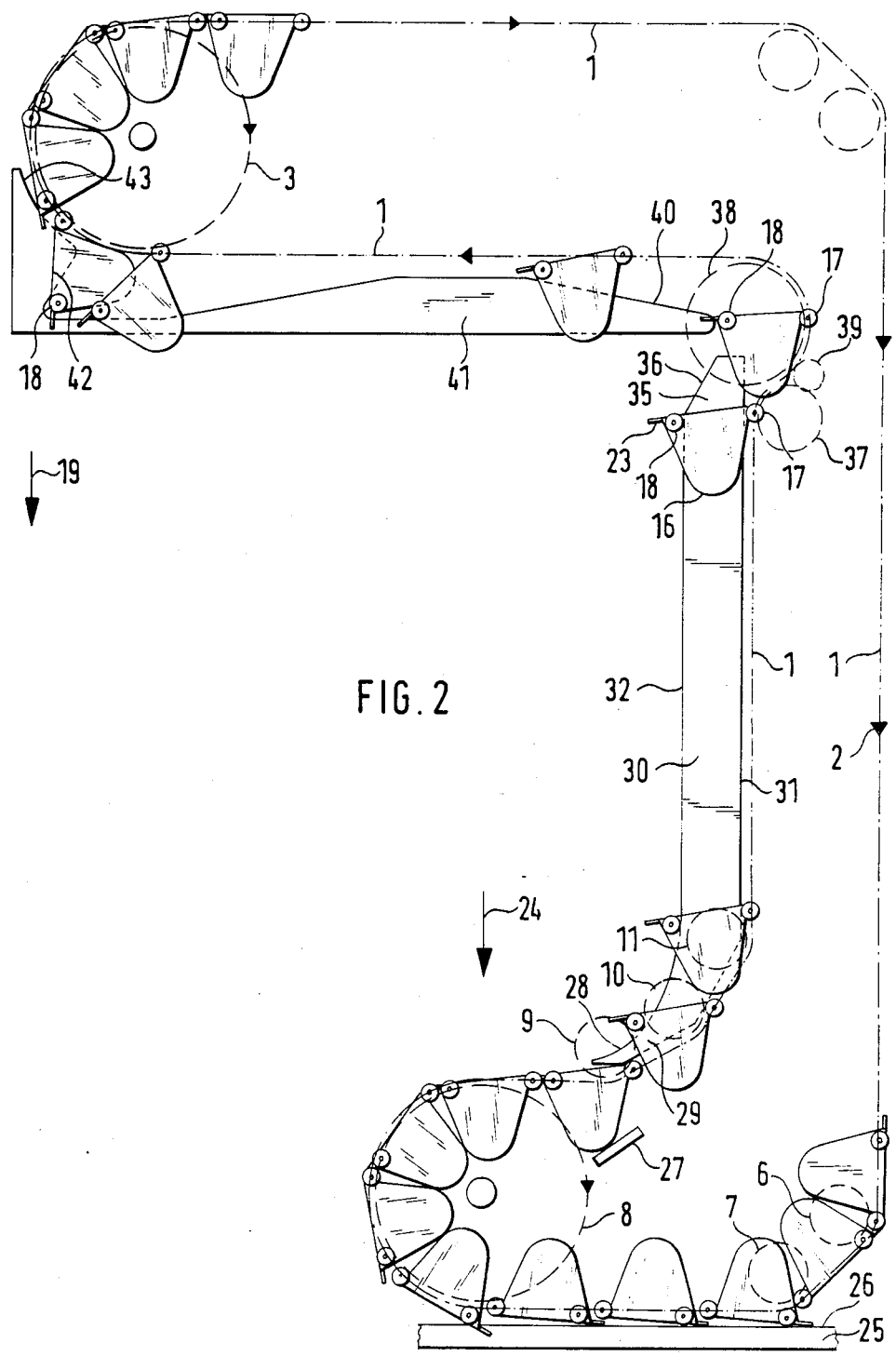
FIG. 2 is another embodiment of a U-shaped bucket conveyor according to the present invention.

FIG. 2 shows in the same way as FIG. 1 a further embodiment of a bucket conveyor, in which a U-shaped layout is employed instead of a S-shaped configuration. This conveyor moves the material upward and laterally. In the lower and vertical areas, this design is similar to that shown in FIG. 1 and identical components are given the same reference numbers. This also applies to drive wheel 3 and the part of the conveyor which runs from the drive wheel downwards.

To turn direction of the buckets 90° from vertical to horizontal motion draw gear 1 runs around the return rollers 37 and 38. At the same height as the guide surface 36, a support roller 39 is provided against which the walls of the buckets bear and advance, so that they essentially maintain their position with their opening facing upwards. Rollers 18 travel upwards as do the spindles 15 and roll onto the bearing or cam surface 40 of the guide rail 41 which serves to prevent full buckets from tipping and thus spilling their load as they move horizontally along the conveyor. In the dumping area 19, the bearing surface 40 is inclined downwards, which initiates the dumping operation. Further along the conveyor, the bearing surface becomes a stop 42 which retains the rollers 18 whereas spindles 15 and the draw gear 1 continue along the conveyor, thus allowing the buckets to be fully tipped and completely emptied. The stop 42 then becomes a cam surface 43 which brings the buckets 16 back to their abutting position around the drive wheels 3.

FIG. 3 shows the abutting function of the buckets 16 in the area of the lower return rollers 8.

FIG. 4 shows a partial cross section IV—IV of FIG. 1 and particularly how rollers 18 come to bear on the bearing surface 20 of the support rail 21. In this case, the draw gear consists of a chain running around the driving wheels 3.

FIG. 5 is a mirror image of FIG. 4, with the chain gear replaced by a rubber tooth drive belt 45 running around a drive wheel 3'.

FIG. 6 shows a large scale side view of a bucket.

What is claimed is:

1. In a bucket conveyor comprising two endless laterally-spaced draw elements trained about drive gears and return gears to carry the buckets on a continuous loop having horizontal and vertical segments, spindles extending between said draw elements, buckets pivotally suspended at upper leading edges from said spindles, each bucket having a supporting lip at an upper trailing edge to form a mobile overlap with the leading edge of an adjacent bucket and guide means to locate the buckets positively, the improvement comprising guide means disposed in the segments of the loop which change direction
from horizontal to vertical and vertical to horizontal lateral pins or rollers on said trailing edge adjacent said suporting lip,
which pins or rollers engage said guide means whereby when the buckets face upwards in a horizontal segment, the trailing edge of the buckets is supported by said supporting lip which rests on the leading edge of the adjacent bucket and whereby when the buckets face outwardly of said loop in circling said return gears and said drive gears the buckets support one another by engagement of adjacent side walls of the buckets.

2. The bucket conveyor of claim 1 in which each bucket is pivotally mounted on a spindle at its trailing edge and its leading edge carries the supporting lip and pins or rollers which engage the guide means.

3. The bucket conveyor of claim 1 comprising a series of adjacent buckets in which each bucket has a stop and a counter stop formed by the front and rear walls of the bucket, said buckets being spaced from each other a distance which causes them to collide with the stops in contact when said draw elements traverse said drive gears and said return gears.

4. The bucket conveyor of claim 3 in which the cross section of the buckets is essentially triangular or trapezoidal.

5. The bucket conveyor of claim 1 in which said bucket includes a pair of rollers one on each end of said spindle and said guide means comprises a pair of spaced vertically-disposed parallel rails adjacent said draw elements, one of which engages said spindle-mounted rollers and the other of which engages said trailing edge rollers to maintain the buckets face up as they move up said vertical rails.

6. The bucket conveyor of claim 5 which includes a transition zone above said vertically-disposed parallel rails comprising
  (a) a return roller centered on an upward extension of the rail of said pair which is immediate to said draw elements,
  (b) a bearing roller inside said loop adjacent said return roller for guiding said draw elements,
  (c) a support roller above said bearing roller against which the walls of the buckets bear to maintain them face up until the buckets reach a point above the axis of said return roller, and
  (d) a horizontal guide means downstream of said return roller and below the horizontal run of said draw elements for supporting said trailing edge rollers.

7. The bucket conveyor of claim 6 in which said horizontal guide means has a cam surface which rises above the axis of said return roller to orient the bucket face up.

8. The bucket conveyor of claim 5 in which said rail at their lower ends have guide surfaces engaging said rollers.

9. The bucket conveyor of claim 8 in which said guide surfaces are sickle shaped.

10. The bucket conveyor of claim 9 which includes a fixed stop against which the walls of said moving buckets bear to tip the buckets so that the rollers slide smoothly onto said guide surfaces.

11. The bucket conveyor of claim 5 in which said parallel rails are spaced at a distance less than the distance between said spindle mounted rollers and said trailing rollers.

12. The bucket conveyor of claim 6 in which the buckets swing freely about said draw elements with said support lips facing downwardly as said draw elements traverse return gears to dump a load downstream of said horizontal guide means.

13. The bucket conveyor of claim 12 which includes tilting means upstream of said dumping area, said tilting means comprising cam surfaces against which said trailing edge rollers bear to tip the bucket into dumping position.

* * * * *